Jan. 13, 1925.

G. L. R. J. MESSIER 1,523,234

AUTOMATIC DILUTION DEVICE

Filed Jan. 3, 1921 4 Sheets-Sheet 1

INVENTOR
GEORGE L. R. J. MESSIER
BY Munn & Co
ATTORNEYS

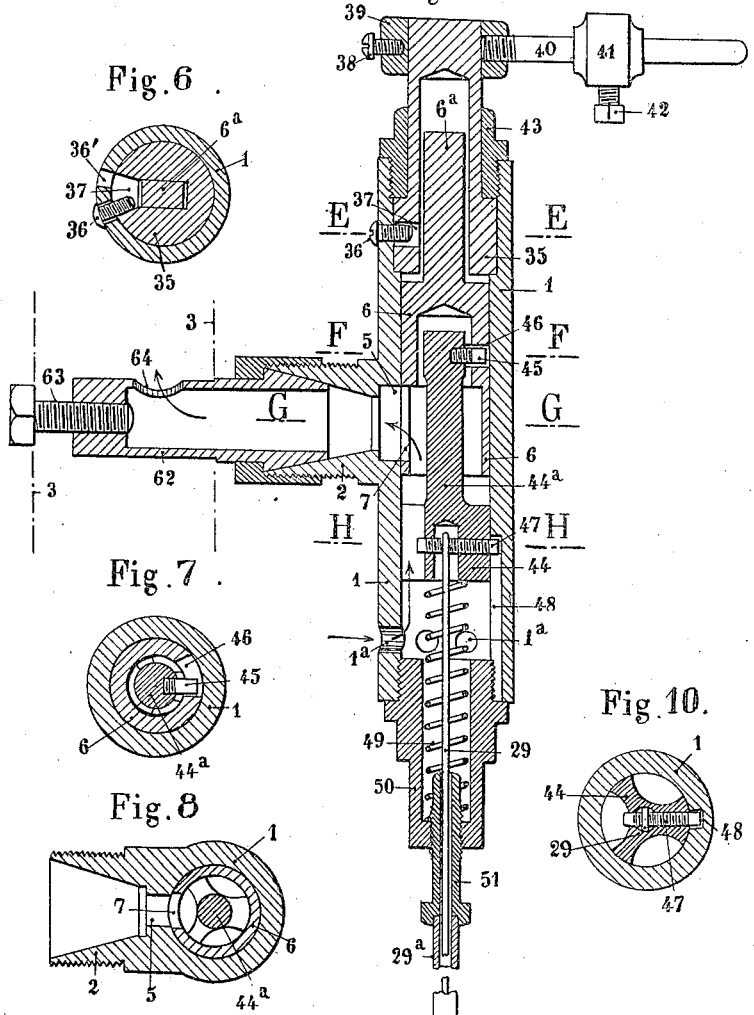

Jan. 13, 1925.
G. L. R. J. MESSIER
1,523,234
AUTOMATIC DILUTION DEVICE
Filed Jan. 3, 1921 4 Sheets-Sheet 3
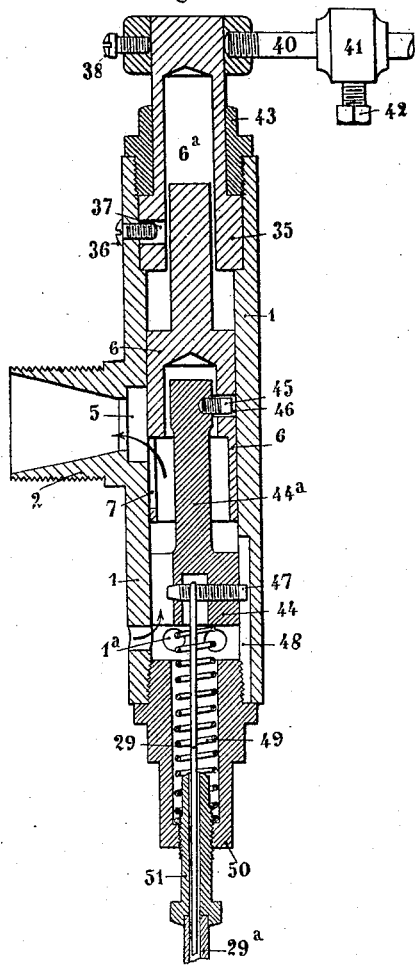
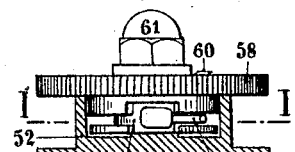
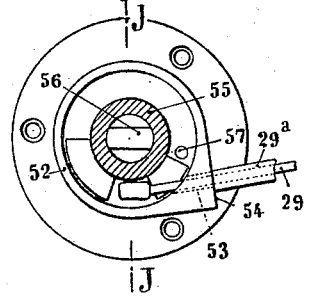
INVENTOR
GEORGE L.R.J. MESSIER
BY Munn & Co.
ATTORNEYS Jan. 13, 1925.

G. L. R. J. MESSIER 1,523,234

AUTOMATIC DILUTION DEVICE

Filed Jan. 3, 1921 4 Sheets-Sheet 4

INVENTOR
GEORGE L. R. J. MESSIER
BY
ATTORNEYS

Patented Jan. 13, 1925.

1,523,234

UNITED STATES PATENT OFFICE.

GEORGE LOUIS RENÉ JEAN MESSIER, OF BORDEAUX, FRANCE.

AUTOMATIC DILUTION DEVICE.

Application filed January 3, 1921. Serial No. 434,530.

*To all whom it may concern:*

Be it known that I, GEORGE LOUIS RENÉ JEAN MESSIER, of 126 Rue Fondaudège, Bordeaux, Gironde, France, have invented an Automatic Dilution Device, of which the following is a full, clear, and exact description.

This invention relates to additional air regulators for carburetors of internal combustion engines and it more particularly concerns regulators in which the cross section of the additional air inlet orifice is controlled by an obturator the movement of which is obtained by the combined action of two independent controls.

The construction adopted according to the invention consists in that the inlet section for the supplementary air is controlled by a cylindrical slide-valve provided with an opening having the size of the inlet section to be controlled. The slide-valve executes a longitudinal displacement and a rotary movement under the action of two controls operating independently from each other.

The movement of rotation of the slide-valve is effected by means of a socket which is capable of rotating freely in the body of the slide-valve, is immobilized in the direction of the axis and is coupled with one of the controls and in this socket can slide an extension of the slide-valve. Relating to the longitudinal movement of the slide-valve, it is derived from the second control and is transmitted to the slide-valve by means of a rod which carries a spider prevented from rotating but allowing a longitudinal movement, this rod entering by means of a screw into a cross slide of the slide-valve.

Figure 1:
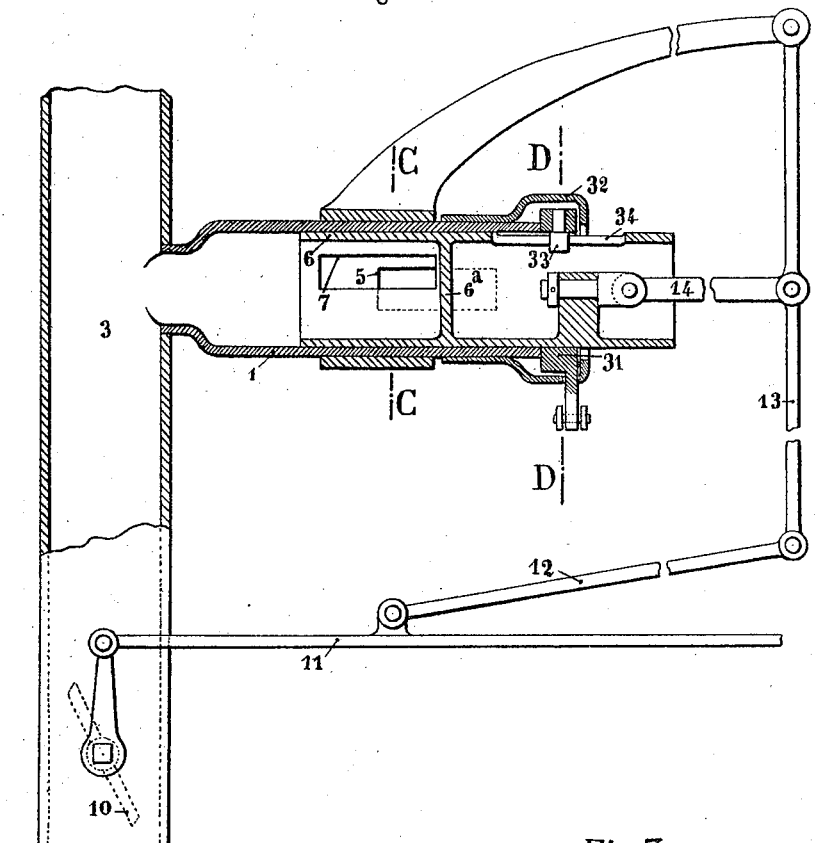
Figure 2:
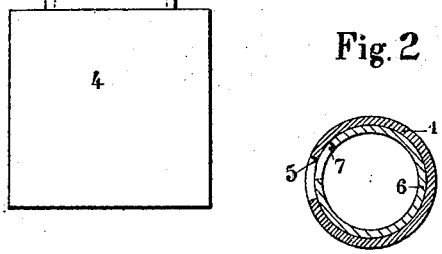
Figure 3:
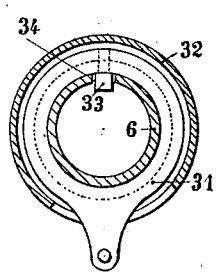

Figs. 1 to 3 illustrate a form of execution of the subject matter of the invention; Fig. 1 is a longitudinal vertical section; Figs. 2 and 3 are vertical sections made respectively according to lines C—C and D—D of Fig. 1.

Figure 13:
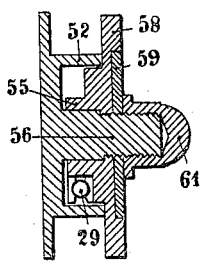
Figure 14:
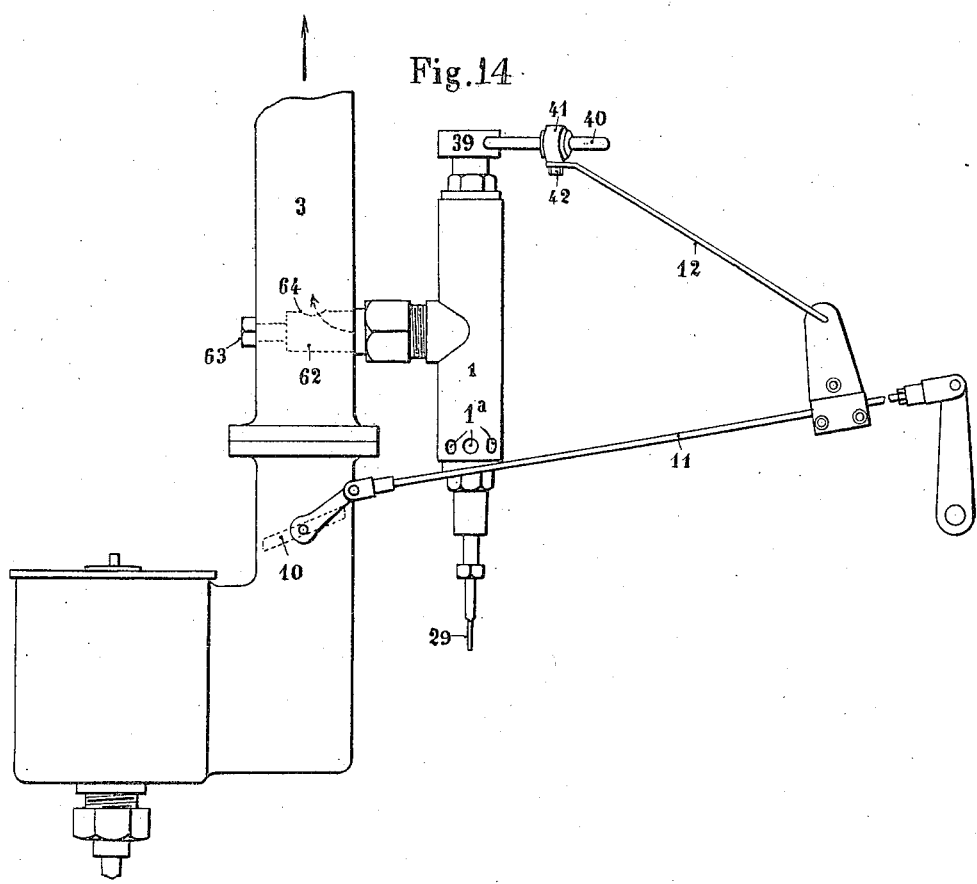

Figs. 4 and 14 illustrate another form of construction; Figs. 4 and 5 show, in vertical section, the present device in its completely open position and in a partially closed position; Figs. 6, 7, 8, 9 and 10 are cross sections made respectively according to lines E—E, F—F, G—G and H—H of Fig. 4; Figs. 11 and 13 are detail views showing a form of construction permitting the operation of the cable actuating the obturator; Fig. 11 is an elevation, partly in section; Fig. 12 is a horizontal section made according to line I—I of Fig. 11 and Fig. 13 is a cross vertical section made according to line J—J of Fig. 12 and Fig. 14 shows in elevation this apparatus in a mode of application.

In the form of construction illustrated in Figures 1 to 3, the device is composed of a fixed cylinder 1 communicating with pipe 3 connecting the carburetor 4 to the suction valves or to the inlet of the engine. The cylinder 1 is perforated with an opening 5 having a certain length putting the gas suction pipe 3 in communication with the atmosphere.

The adjustment of the cross-section of this opening 5 is obtained by means of a second cylinder 6, closed at a certain point of its length by a partition $6^a$ and perforated with an opening 7 having the same dimensions as those of the fixed cylinder 1.

This cylinder 6 is mounted within the cylinder 1 so as to be capable of receiving in the latter a longitudinal displacement, for the purpose of causing one of the dimensions of the fixed opening 5 to vary and a rotary movement on its longitudinal axis, so as to modify the other dimension of the said opening 5.

The longitudinal displacement is produced by the opening of the throttle 10 the control link 11 of which is connected for that purpose to the movable cylinder 6, by the link 12, the rocking lever 13 and the link 14; the latter is connected to the cylinder 6 by a ball and socket joint or other suitable joint, arranged in the axis of this cylinder and enabling the latter to receive a rotary movement independent from the longitudinal displacement.

This rotary movement is obtained at will by the driver by means of a handle or other control member arranged within reach of the latter and connected, by a flexible or like transmission, to a collar 31 surrounding the cylinder 6 and arranged within a guide sleeve 32 integral with the cylinder 1 and preventing the longitudinal displacement of the said collar.

This collar 31, which can thus receive a rocking movement of variable amplitude depending on the desire of the driver, transmits this rocking movement to the cylinder 6 by means of a finger or stud 33 projecting, for that purpose, in a rectilinear slide 34 of the said cylinder 6.

The apparatus illustrated Figs. 4 to 14 comprises a fixed cylindrical body 1 provided at its lower part with air inlet holes 1ª and towards the middle part of its height with an orifice 5; a branch 2 forms an extension of this orifice and is connected, as indicated hereafter, with the pipe 3 connecting the carburetor to the engine, between the throttle and the latter.

The passage of the air through the branch 2 is controlled by an obturator 6 having a tubular shape, open at its lower part, closed at its upper end and provided on its side with a port 7, the dimensions of which correspond to those of the orifice 5. This obturator is capable of receiving a double movement within the fixed cylindrical body 1; a rotary movement about its longitudinal axis and a longitudinal displacement.

The rotary movement is imparted to the obturator 6 by a socket 35 capable of rotating freely in the fixed body 1; in this socket, which has internally a rectangular cross section, fits an extension 6ª of the obturator, this extension being of a flat shape.

The angular displacement which can be imparted to the socket 35 is limited by an abutment screw 36 secured in a screw threaded hole provided in the wall of the fixed body 1 and fitting in a recess 37 in a part of the periphery of the socket 35 (Fig. 6); the width and position of this recess are determined in such a manner that one of its ends abuts against the screw 36, in the fully open position of the obturator 6 (Fig. 6) and that the other end abuts on the contrary against the screw 36 in the fully closed position of the said obturator.

In the fixed body 1 is formed another screw threaded hole 36', so that the abutment-screw 36 may be optionally placed either in the position illustrated in Fig. 6, or in this hole 36' and thus permit of effecting the closing of the obturator by rotating the socket 35 in one direction or the other according to the necessities for the erection.

On the socket 35 is secured, by means of a set screw 38, a ring 39 carrying a control handle 40 on which is secured, at a suitable point, a slide-block 41 carrying a set screw 42 and connected by a link 12 to the driving rod 11 of the throttle 10.

This device permits of clamping the control handle 40 in any position and to give to the lever arm any desired length, so as to always obtain, whatever may be the requirements for the erection, a perfect concordance between the positions of the obturator 6 and of the throttle 10.

The socket 35 is held in the fixed body 1 by a tubular plug 43 screwed in the latter.

The longitudinal displacement of the obturator 6 is controlled by a slide block constituted by a cross 44 on the top of which is arranged an axial rod 44ª carrying at its upper part a screw 45 acting as a claw fitted in a transverse slide way 46 provided in the obturator 6 (Fig. 7).

This slide block is guided by means of a screw 7 secured in the cross 44 and the head of which is fitted in a longitudinal slot 48 provided in the fixed body 1.

The slide block is pulled upwards by a spring 49 taking a bearing within a plug 50 screwed in the fixed body 1 and can be moved downwards by means of a flexible transmission.

The end of the flexible cable 29 of the latter is fitted in a recess formed in the cross 44 and is wound around the screw 47, as shown in Fig. 10; the end of the screw 47 is slightly conical so as to exert a wedging action on the loop of the cable and to thus ensure an energetic clamping of the latter; this cable passes in a tubular screw 51 screwed in the plug 50 and leads to the operating member. In the head of this screw 51 is secured the end of the flexible sheath 29ª which encloses the cable 29.

The control of the flexible transmission may be operated by means of any operating system placed within reach of the driver of the vehicle. Figs. 4, 11, 12, and 13 illustrate, by way of example, a form of construction of this operating device.

This device comprises, on the one hand, a fixed bowl 52 provided on its side with a hole 53 through which passes the cable 29 and a shoulder 54 against which fits the flexible sheath 29ª and, on the other hand, a drum 55 capable of rotating freely about a central rod 56 carried by the bowl and to which is hooked the end of the cable, as illustrated in Figs. 11, 12 and 13. A claw 57 carried by the bottom of the bowl 52 limits the angular displacement of the drum. This drum 55 is integral with a milled head 58 carrying a scale on its upper face. On its central rod 56 is mounted a fixed disc 59 provided with an index 50. A nut 61 screwed on the end of the central rod 56 maintains the drum in the bowl.

By causing the milled head 58 to rotate, an angular displacement is imparted to the drum 55, which in its movement of rotation exerts a traction on the cable.

The extreme divisions of the scale carried by the milled head 58 correspond to the two ends of the stroke of the obturator and the intermediate divisions indicate the intermediate positions of the latter. By means of the division of the milled head 58 which comes opposite the fixed index 60, the driver can see at any time the position of the obturator 6.

The disc 59 fitted in the flat end of the central rod 56 cannot rotate and, under the action of the nut 61, presses on the milled head 58, thus exerting on the latter a braking action under the effect of which this milled head 58 always remains in the position in which it has been placed.

The displacement of the slide block 44 could be controlled by any other system of rigid or flexible transmission, for instance through the medium of links and intermediate gearing.

The present type of apparatus is branched on the pipe 3 connecting the carburettor to the engine by the following device:

On the branch 2 is mounted a connection 62 which is fitted in the piping and is secured endwise therein by a screw 63, as shown in Figs. 4 and 14; in this connection 62 is formed a hole 64 for the passage of the air.

The working of this type of apparatus is as follows:

In the position of rest or when the apparatus is not to be used, the obturator 6 is held at the bottom of its stroke and entirely closes the orifice 5.

In this position, whatever may be the angular displacement controlled by the pedal of the accelerator, the orifice 5 constantly remains covered by the upper part of the obturator 6.

When the apparatus is to be put in operation, the driver turns the milled head 58 so as to permit to the obturator 6 of moving upward, under the action of its spring 49.

When the throttle 10 is opened, the obturator 6 receives at the same time, through the medium of the link 12, handle 40 and socket 35, an angular displacement and, through its port 7, partially uncovers the opening 5. Under the action of the partial vacuum produced by the engine in the piping 3, the air from the exterior enters the apparatus through the openings 1ª, passes between the branches of the cross 44, inside the obturator 6 and is admitted in the piping 3 through the portion of the opening 5 uncovered by the obturator 6. Consequently, according as the throttle is more or less open, the orifice of the passage offered to the air is more or less wide. This admission of additional air thus controlled by the throttle can be modified at any moment by the driver; in fact, the latter, by moving the milled head 58 of the control apparatus, can impart, as above stated, a longitudinal displacement to the obturator 6 and thus cause the height of the orifice through which the air is admitted in the piping 3 to vary, as shown in Fig. 5.

It is to be noted that by means of this device the two faces of the portion of the obturator 6 which fits on the opening 5 provided in the fixed body 1, receive different pressures; the outer face is subjected to the reduced pressure produced by the engine in the piping 3 and the inner face is subjected to the atmospheric pressure. It follows therefrom that the obturator 6 is thus always perfectly applied against the portion of the inner surface of the fixed body 1 in which is provided the orifice 5 and, in these conditions, no leakage can ever take place in the apparatus, even if some play occurs between the obturator and the fixed body 1.

In order to permit the obturator to be thus applied under the action of the atmospheric pressure against the inner wall of the fixed body 1, the flat extension 6ª, of this obturator can move sidewise within the socket 35.

In the type of the apparatus which has just been described, the two controls might be inverted, that is to say that the longitudinal displacement of the obturator might be controlled by the device which actuates the throttle, and its rotary movement by a flexible or rigid transmission device actuated by the driver.

The above described constructional arrangements are given by way of example only and it is obvious that the form, dimensions and details of construction of the constituent elements of the present type of apparatus can be modified.

Claims—

1. An apparatus of the kind described comprising: a fixed tubular body closed at both ends, openings provided adjacent one of its ends through which the atmospheric air can freely enter, a port in the fixed tubular body for the escape of the air, means for connecting this air outlet port with the piping admitting the gaseous mixture to the engine, an obturator movable inside this fixed body, the said obturator being closed at one of its ends and open at the other end, so that the air admitted in the fixed body may freely enter therein, a port in this obturator, having dimensions corresponding to those of the air outlet port of the fixed body, means for imparting to the obturator an angular displacement about its axis, means for imparting to the said obturator a longitudinal displacement, means for imparting one of these displacements through the medium of the control member of the throttle of the engine and the other displacement through a direct control actuated by the driver.

2. An apparatus of the kind described comprising: a fixed tubular body closed at both ends, openings provided adjacent one of its ends through which the atmospheric air can freely enter, a port in the fixed tubular body for the escape of the air, means for connecting this air outlet port with the piping admitting the gaseous mixture to the engine, an obturator movable inside this fixed body, the said obturator being closed at one of its ends and open at the other end, so that the air admitted in the fixed body may freely enter therein, a port in this obturator, having dimensions corresponding to those of the air outlet port of the fixed body, a socket mounted at one of the ends of the fixed body so as to be capable of rotating freely in the latter and in which can slide an extension of the obturator, the inner recess of the socket and the extension of the obturator being constituted in such a manner that the socket draws along the obturator in its rotary movement whilst permitting the longitudinal displacement of the latter, a control handle rigidly secured on this socket, means for connecting this handle to the transmission member controlling the throttle of the engine, a slide block longitudinally movable within the fixed tubular body, means for connecting the said slide block to the obturator so as to draw it along in its longitudinal displacement, whilst permitting it to rotate freely, an antagonistic spring pushing back the slide block to one of the ends of its stroke, a flexible transmission the cable of which is secured at one of its ends to the slide block and through which the slide block can be moved longitudinally, a plug closing the other end of the fixed body and to which is adapted the sheath of the flexible transmission, means enabling the driver to act on the cable of this flexible transmission.

The foregoing specification of my "device for correcting the excesses of gasoline in the gaseous mixtures supplied by the carburetors" signed by me this 14th day of December, 1920.

GEORGE LOUIS RENÉ JEAN MESSIER.